(12) United States Patent
Alexander, IV

(10) Patent No.: US 6,379,087 B1
(45) Date of Patent: Apr. 30, 2002

(54) CUTTING INSERT WITH SPLIT FACE CLAMPING SURFACES AND TOOLHOLDER THEREFOR

(75) Inventor: William M. Alexander, IV, North Huntingdon, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/498,806

(22) Filed: Feb. 7, 2000

(51) Int. Cl.$^7$ ................................ B23B 29/04
(52) U.S. Cl. .................... 407/107; 407/105; 407/106
(58) Field of Search .................. 407/113, 114, 407/115, 116, 64, 66, 102, 104, 105, 106

(56) References Cited

U.S. PATENT DOCUMENTS

| | | |
|---|---|---|
| 280,148 A | 6/1883 | Douglas |
| 2,240,404 A | 4/1941 | King ............................. 83/11 |
| 3,299,489 A | 1/1967 | Pohle ............................ 29/96 |
| 3,341,921 A | 9/1967 | Weller et al. .................. 29/96 |
| 3,399,442 A | 9/1968 | Jones et al. .................... 29/95 |
| 3,525,136 A | 8/1970 | Crosby .......................... 29/96 |
| 3,629,919 A * | 12/1971 | Trevarrow, Jr. ............. 407/103 |
| 3,754,309 A | 8/1973 | Jones et al. ................... 29/96 |
| 3,762,005 A | 10/1973 | Erkfritz ......................... 29/95 |
| 4,477,212 A | 10/1984 | Kraft ........................... 407/104 |
| 4,480,950 A | 11/1984 | Kraft et al. .................. 407/103 |
| D347,012 S | 5/1994 | Huston et al. ............. D15/139 |
| 5,494,383 A * | 2/1996 | Kress et al. ................ 408/231 |
| 5,611,649 A | 3/1997 | Matthias ..................... 407/118 |
| 5,658,100 A | 8/1997 | Deiss et al. ................... 407/35 |
| 5,704,737 A | 1/1998 | Alford ......................... 407/114 |
| 5,820,311 A * | 10/1998 | Grun et al. ................. 407/102 |
| 5,915,889 A | 6/1999 | Kress et al. ................ 407/114 |
| 6,116,824 A * | 9/2000 | Strand et al. .................. 407/40 |

FOREIGN PATENT DOCUMENTS

DE  197.3448  7/1998

OTHER PUBLICATIONS

Kennametal brochure. "Top Notch® Turning System" Catalog 9004, 16 pp. (1999).
Kennametal brochure, "KennaMAx KennaPERFECT Turning System" © (1999) A99–141.

* cited by examiner

*Primary Examiner*—Henry Tsai
(74) *Attorney, Agent, or Firm*—John J. Prizzi

(57) ABSTRACT

A cutting insert has a central cavity with a plurality of pairs of clamping surfaces wherein the clamping surfaces of a pair are separated from one another by a recess to provide split face clamping surfaces within the cavity of the insert. The insert may be secured within the pocket of a toolholder.

37 Claims, 10 Drawing Sheets

CUTTING INSERT WITH SPLIT FACE CLAMPING SURFACES AND TOOLHOLDER THEREFOR

FIELD OF THE INVENTION

The invention is directed to cutting inserts and, more particularly, to a cutting insert with a unique central cavity used to hold the insert within the pocket of a toolholder.

BACKGROUND OF THE INVENTION

Cutting inserts are well known and a large percentage of them are of the throwaway design. Such inserts are detachably clamped on a toolholder and are removed from the toolholder and discarded when they become dull or chipped. Throwaway inserts are usually indexable so that an insert can be provided with at least two cutting edges for selective presentation to a workpiece. An indexable insert having multiple cutting edges is more economical because when one edge has been used, the insert may simply be indexed to the next usable edge. Such a feature is especially important when considering the high cost of materials from which inserts are produced.

In general, inserts must be securely and accurately held in place within an insert holder during the cutting operation. This is especially true when the inserts are deployed with numerically controlled machines which depend for accuracy upon an accurately located and firmly supported insert. When the inserts are large enough, it is possible to secure the insert both accurately and firmly within the pocket of a toolholder by providing the insert with a central hole and the toolholder with a pin-type clamping device. In other cases, such inserts may be held in place by a top clamp. Examples of such holders are found in U.S. Pat. Nos. 3,754,309; 3,399,442 and 3,762,005.

Whenever a central hole exists within an insert, the overall strength of the insert is somewhat reduced. The strength of the insert is reduced to a lesser degree whenever a cavity is placed within the insert for engagement by a top clamp. Nevertheless, whenever any material is taken from the insert body the insert, to some degree, weakens. The insert must, however, be secured within a toolholder and this typically requires the introduction of either a hole or a cavity within the insert to engage a pin through the insert or a clamp against the insert.

Cutting inserts for metalworking operations are typically made of wear-resistant material such as a hard cemented carbide or cermet comprised of tungsten carbide, titanium carbide, tungsten titanium carbide or TiC-TiN and a binder material such as cobalt, iron and/or nickel. The wear-resistant material may also be a tool steel or a ceramic material, such as aluminum oxide-based, silicon nitrate-based, or silicon-based ceramic materials.

It is an object of the subject invention to provide a central hole or cavity within an insert having a shape that permits the insert to be clamped in a variety of different index positions while minimizing the amount of material removed from the insert.

It is a further object of this invention to provide a plurality of clamping surfaces which may be as wide as possible within a given cavity.

Still other objects of the present invention will become apparent to those of ordinary skill in the art upon reading and understanding the following detailed description.

SUMMARY OF THE INVENTION

A cutting insert intended to be held within a toolholder by a clamp is comprised of a body of wear-resistant material. The body has a central longitudinal axis extending therethrough. The body also has a top surface and a bottom surface, a peripheral wall therebetween and a cutting edge formed by the intersection of the peripheral wall and the top surface. A central cavity extends within the top surface and has cavity walls defining a plurality of pairs of clamping surfaces. The clamping surfaces of a pair are separated from one another by a recess. In one embodiment, for a pair of clamping surfaces, the associated recess is preferably comprised of other clamping surfaces associated with different pairs of clamping surfaces.

The cavity has a perimeter and the perimeter preferably has the shape of an equilateral polygon. The recesses may be symmetrically positioned about the central longitudinal axis.

In an alternate embodiment, an indexable cutting insert intended to be held within a toolholder by a clamp is comprised of a body of wear-resistant material. The body has a central longitudinal axis extending therethrough. The body also has a top surface and a bottom surface, a peripheral wall therebetween, and a cutting edge formed by the intersection of the peripheral wall and the top surface.

A central cavity extends within the top surface and has cavity walls defining a plurality of pairs of clamping surfaces. The clamping surfaces of a pair are separated from one another by a recess. The perimeter of the cavity is preferably made up of two or more identical shapes superimposed upon one another and having as a common center point the central longitudinal axis.

Additionally, a toolholder assembly is comprised of a toolholder with a body having a pocket formed therein which has at least one side wall and a bottom wall. The assembly is further comprised of a cutting insert with an insert body having a top surface and a bottom surface with a peripheral wall therebetween. A cutting edge is formed by the intersection of the peripheral wall and the top surface. A central cavity extends within the top surface and has cavity walls defining a plurality of pairs of clamping surfaces, wherein the clamping surfaces of a pair are separated from one another by a recess. For each pair of clamping surfaces, the associated recess is comprised of other clamping surfaces associated with different pairs of clamping surfaces. The insert mounts within the toolholder pocket and a clamp mounted upon the toolholder having a protruding nose which engages a pair of the insert clamping surfaces and urges the insert into the pocket.

BRIEF DESCRIPTION OF THE DRAWINGS

The above, as well as other features and advantages of the invention, will become apparent through a consideration of the detailed description in conjunction with the several drawings in which.

DETAILED DESCRIPTION OF THE PREFERRED EMBODIMENT

Figure 1:
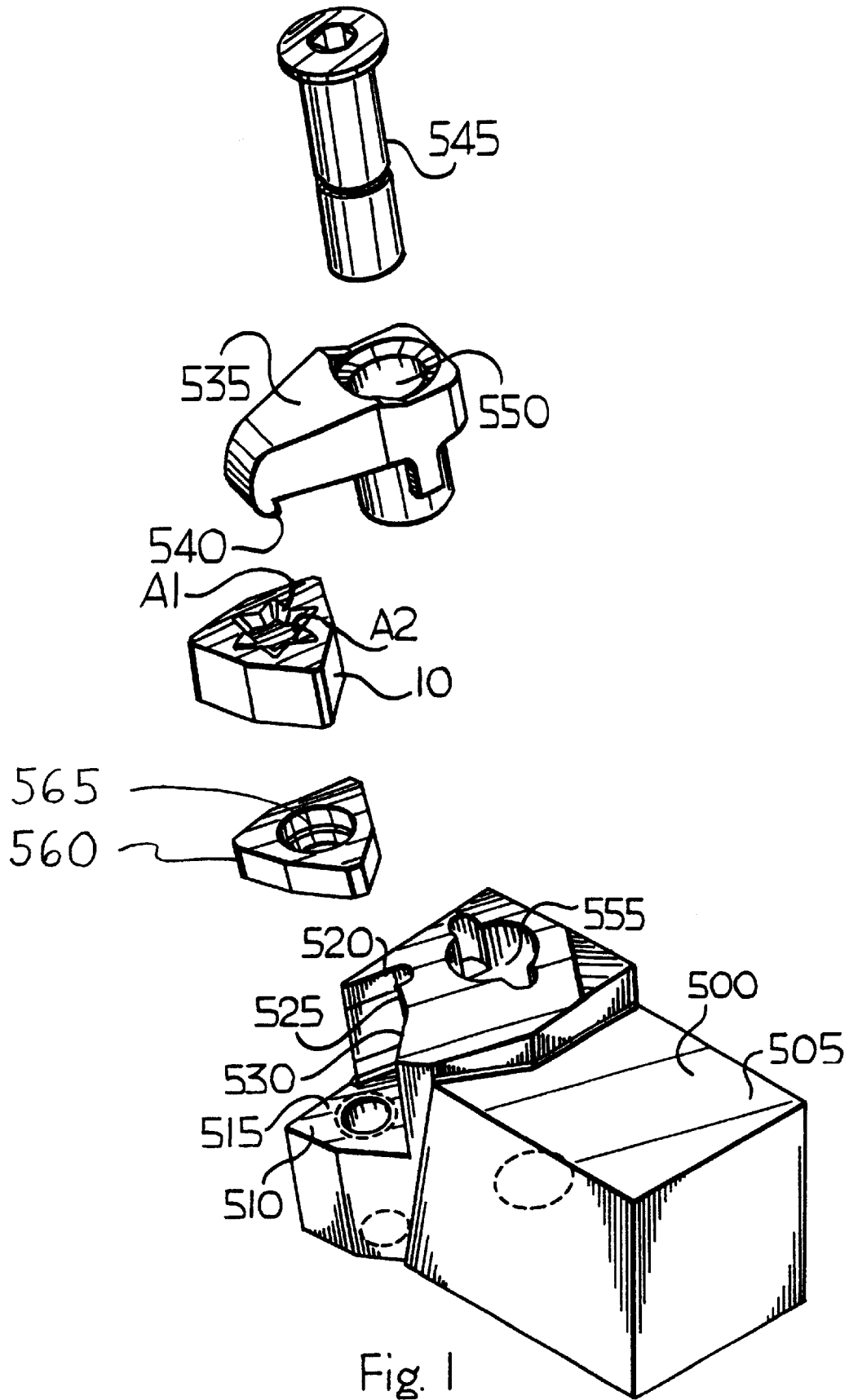
FIG. 1 is an exploded perspective view illustrating a typical toolholder and clamping arrangement for use in combination with one cutting insert of the subject invention.

FIG. 1 shows a cutting insert 10 intended to be held within a toolholder 500. The toolholder 500 may be in the form of a bar-like steel member 505 adapted for being clamped in a tool support of any suitable type. At one end of the member 505, there is an insert pocket 510 having a bottom wall 515, a first side wall 520, a second side wall 525 and a third side wall 530. A clamp 535 having a nose 540 is used to secure the insert 10 within the pocket 510 of the toolholder 500. A bolt 545 extends through a bore 550 within the clamp 535 to engage a threaded bore 555 in the toolholder body 505. The bolt 545 urges the clamp 535 against the insert 10 such that the clamp nose 540 engages clamping surfaces A1, A2 in a cavity 20 within the insert 10. The clamp 535 is oriented such that the clamp nose 540 urges the insert downwardly against the bottom wall 515 and laterally against the sides 520, 525, 530 of the pocket 510 engaging the bottom 30 and subsides 50a, 45b and 45a (FIG.4) respectively of the insert 10. A shim 560 vertically positions the insert 10 within the pocket 510 and is secured within the pocket 510 by a screw (not shown) extending through a bore 565 in the shim 560 and into the bottom wall 515 of the pocket 510.

Figure 2:
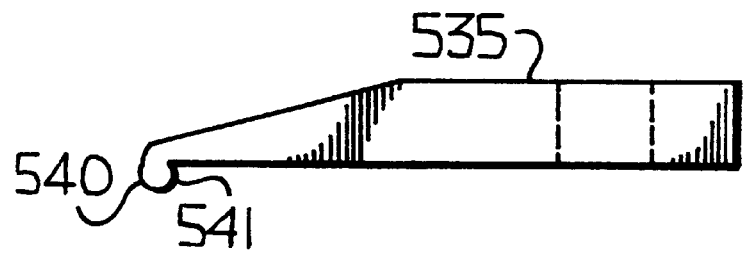
FIG. 2 is a side view of a toolholder clamp illustrating a protruding nose with a cylindrical surface.
Figure 2A:
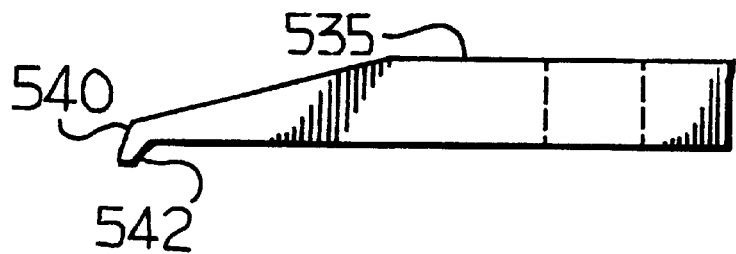
FIG. 2A is a side view of a toolholder clamp illustrating a protruding nose with a planar surface.

The protruding nose 540 on the clamp 535 may have a variety of different configurations depending upon the configuration of the cavity 20 in the insert 10 and the type of contact that is desired between the clamp nose 540 and the clamping surfaces of the insert cavity 20. FIG. 2 illustrates one configuration in which the protruding nose 540 has a section 541 with a cylindrical profile. The cylindrical profile section may have a flat or, in the alternative, a barrel-shaped contour. FIG. 2A illustrates another configuration in which the protruding nose 540 has a section 542 with a planar profile.

Figure 3:
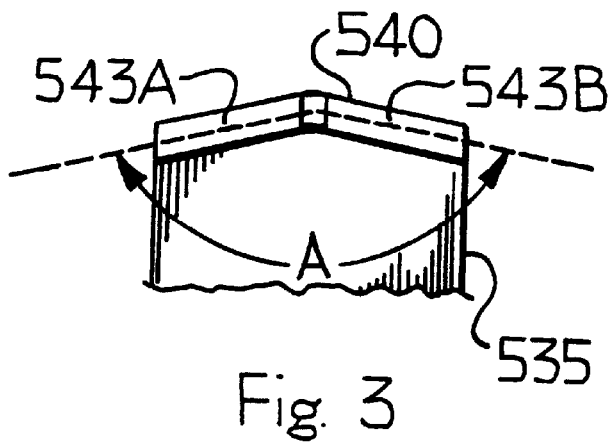
FIG. 3 is a view of the underside of a toolholder clamp illustrating a protruding nose with angled contact surfaces.
Figure 3A:
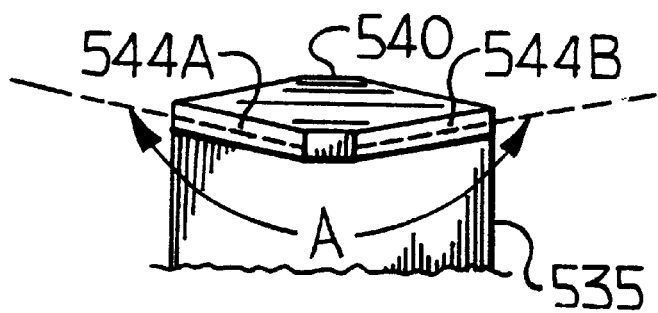
FIG. 3A is a view of the underside of a toolholder clamp illustrating a protruding nose with angled contact surfaces.

FIG. 3 is a view of the underside of a clamp 535 in which the protruding nose 540 is made up of one section 543A and a complementary section 543B which form an angle A of less than 180 degrees with one another. FIG. 3A is a view of the underside of clamp 535 in which the protruding nose 540 is made up of one section 544A and a complementary section 544B which form an angle A of less than 180 degrees. Each of these clamp designs will be again discussed with an appropriately compatible insert cavity.

Figure 4:
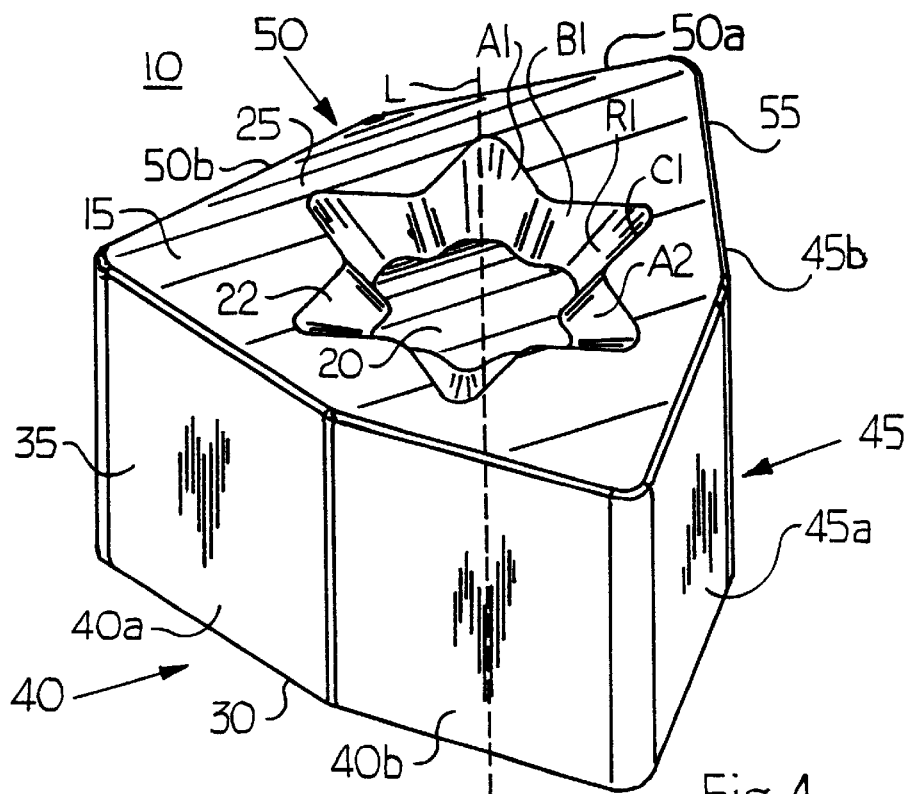
FIG. 4 is an isometric view of a cutting insert in accordance with a first embodiment of the present invention.

Directing attention to FIG. 4, the insert 10 is comprised of a body 15 of wear-resistant material. A central longitudinal axis L extends through the insert 10. The insert 10 has a top surface 25 and a bottom surface 30 with a peripheral wall 35 therebetween defining sides 40, 45, 50 each comprised of two subsides 40a, 40b; 45a, 45b; and 50a, 50b. A cutting edge 55 is formed by the intersection of the peripheral wall 35 and the top surface 25.

Figure 5:
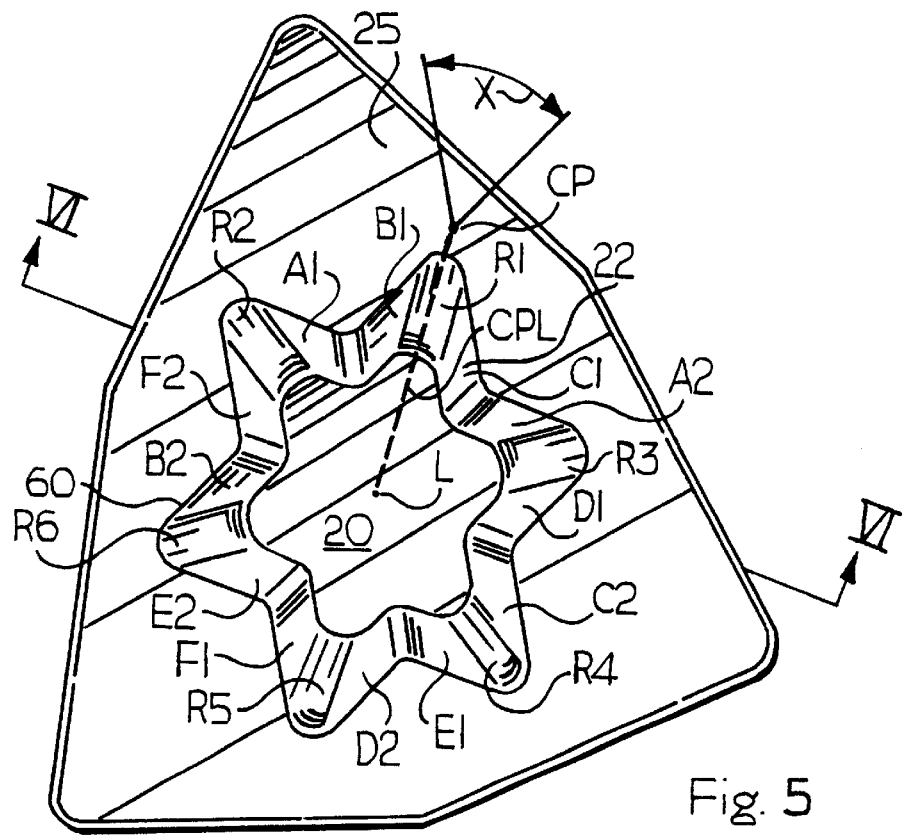
FIG. 5 is a top view of the insert illustrated in FIG. 4.

As illustrated in FIGS. 4 and 5, the cavity 20 extends within the top surface 25 and has cavity walls 22 defining a plurality of pairs of clamping surfaces A1–A2 through F1–F2. The clamping surfaces of each pair are separated from one another by a recess R1–R6. For example, clamping surfaces A1–A2 form a pair of surfaces which are separated from one another by recess R1.

Each pair A1–A2 through F1–F2 of clamping surfaces may be coplanar. However, as will be discussed, other designs are also possible.

For purposes of the remainder of the discussion directed to FIGS. 4 through 7, unless otherwise noted, the pair of clamping surfaces A1–A2 and the associated recess R1 will be discussed with the understanding that these features exist for each of the other pairs of clamping surfaces and each of the other recesses.

For each pair of clamping surfaces, as illustrated by clamping surfaces A1–A2, the associated recess R1 is preferably comprised of two other clamping surfaces B1, C1, each associated with different pairs of clamping surfaces B1–B2 and C1–C2.

Directing attention to FIG. 5, the cavity 20 has a perimeter 60 which has the shape of an equilateral polygon and the recesses R1–R6 are symmetrically positioned about the central longitudinal axis L.

Because each pair of clamping surfaces A1–A2 is separated by a recess R1, the pairs of clamping surfaces are referred to as split-faced. While this split-faced feature provides less surface area for contact by the clamp than if the clamping surface was continuous, the introduction of the recess R1 provides a significant benefit in that additional clamping surfaces that would otherwise not be available are now available. This is especially important in indexable inserts which are capable of being indexed in a variety of different orientations to expose different portions of the cutting edge 55 to a workpiece. Additionally, by providing a split-faced clamping surface, the nose 540 of the clamp 535 is able to engage the insert 10 at the widest portion of the cavity 20. This arrangement is particularly desirable for ceramic cutting inserts since these inserts are exceptionally tolerant of compressive forces and the cavity offers multiple pairs of clamping surfaces. It should be appreciated, however, that the subject invention does not exclude the possibility of the insert having a through-hole with multiple clamping surfaces on the side of the through-hole to accept a clamp.

By providing a cavity 20 having pairs of clamping surfaces A1–A2 through F1–F2, it is possible to provide a plurality of pairs of clamping surfaces wherein each clamping surface has a significant area capable of accepting the nose 540 of the clamp 535. As an example, the cavity 20 in FIG. 5 provides six pairs of clamping surfaces A1–A2 through F1–F2. A cavity providing six clamping surfaces, without the use of recesses associated with the subject invention, would require the use of a hexagonal-shaped cavity wherein each singular clamping surface would be an entire side of the cavity and each side would not be as wide as the present design. Furthermore, it may be impossible to fabricate such a cavity because the associated cavity would extend beyond the peripheral wall 35 of the cutting insert 10.

Returning to FIG. 5, each recess as represented by recess R1 may be V-shaped and the recesses R1–R6 may be equally spaced from and symmetrically located about the central axis L. A typical recess R1 may be made of two clamping surfaces B1, C1 which form a recess angle X with one another of at least 60 degrees.

The cutting insert 10 illustrated in FIGS. 1, 4 and 5 has a body 15 in the shape of a trigon. As will be discussed, the shape of the insert, just as the shape of the cavity, may vary according to the application needs.

Figure 6:
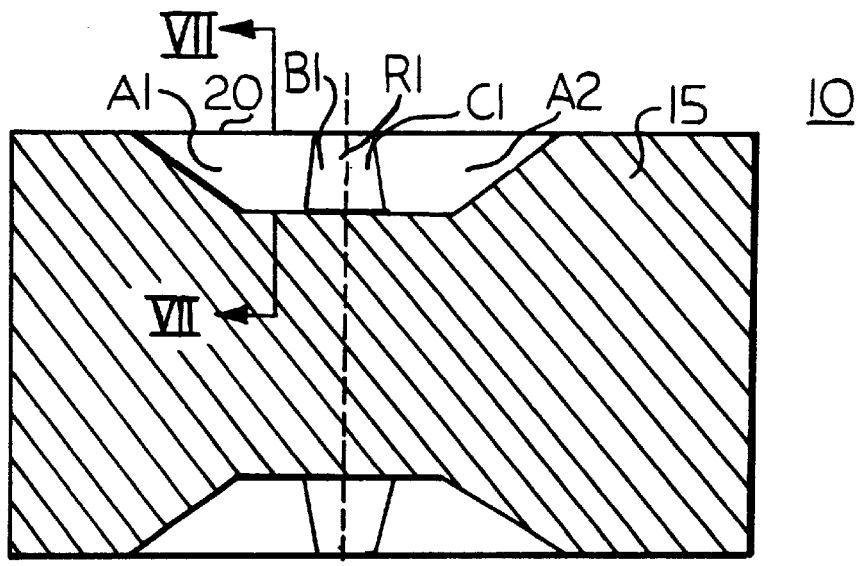
FIG. 6 is a cross-sectional view along arrows VI—VI in FIG. 5.
Figure 7:
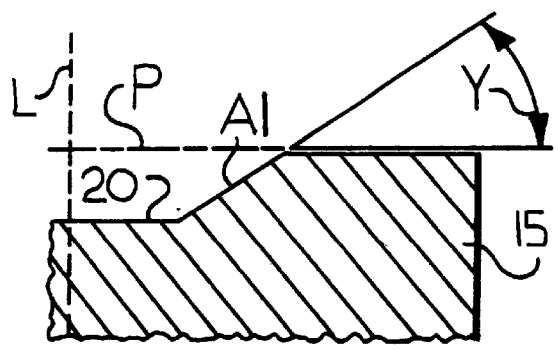
FIG. 7 is a partial cross-sectional view along arrows VII—VII in FIG. 6.

Directing attention to FIGS. 6 and 7, FIG. 6 is a cross-sectional view along arrows VI—VI in FIG. 5 and illustrates a direct view of clamping surfaces A1 and A2 and further illustrates clamping surfaces B1 and C1 within recess R1. When insert 10 is oriented within the pocket 510 of the toolholder 500 (FIG. 1), the nose 540 of the clamp 535 contacts clamping surfaces A1 and A2 urging at least two sides, or as illustrated in FIG. 4 three subsides 45*a*, 45*b* and 50*a*, of the insert 10 against the pocket walls to secure the cutting insert 10 within the pocket 510. As previously discussed, the contour of the nose 540 may have a cylindrical profile 541 (FIG. 2), thereby providing a line contact on clamping surfaces A1 and A2. However, in the alternative, the nose 540 may have a planar profile 542 (FIG. 2A) which aligns with the planar clamping surfaces A1 and A2 and may provide area contact as opposed to line contact with these surfaces.

FIG. 7 illustrates a partial sectional view along arrows VII—VII in FIG. 6. More particularly, FIG. 7 illustrates that the clamping surfaces, for which clamping surface A1 is used as an example, are inclined with respect to the central longitudinal axis L. This inclination is defined by a clamping angle Y between, for example, clamping surface A1 and a plane P perpendicular to the central longitudinal axis L, wherein the clamping angle Y is between about 30 and about 70 degrees and is preferably about 46 degrees.

FIGS. 1, 4 and 5 illustrate pairs of clamping surfaces A1–A2 through F1–F2 wherein each pair is illustrated as coplanar.

Figure 8:
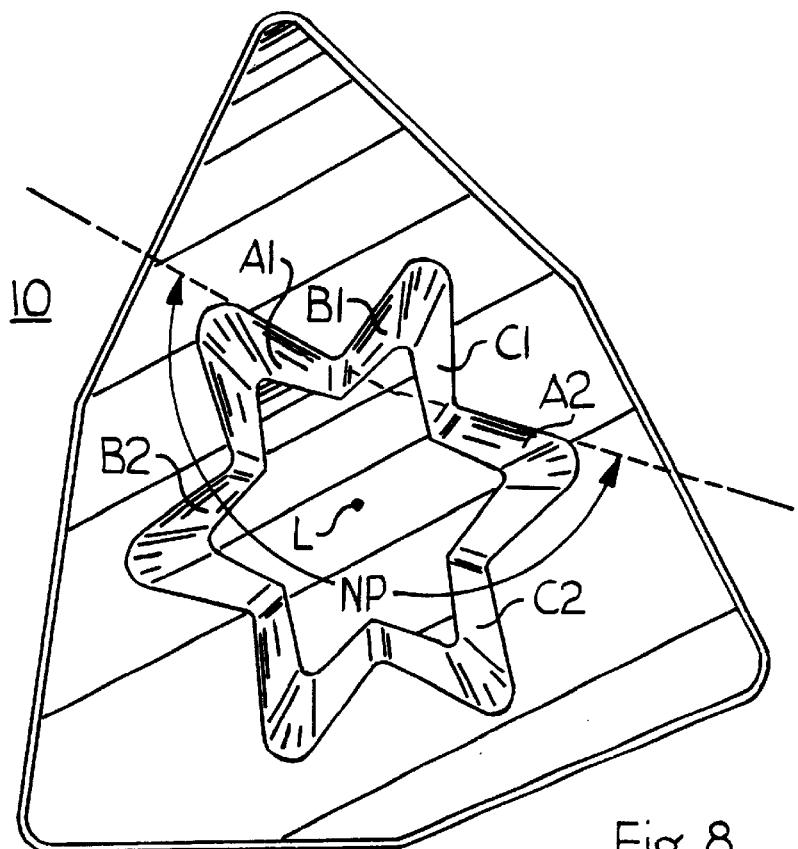
FIG. 8 is a variation of the top view illustrated in FIG. 5 whereby each pair of clamping surfaces is angled.

FIG. 8. illustrates an arrangement in which the pairs of clamping surfaces are planar but not coplanar within each pair. This arrangement is identical to the cavity 20 previously discussed with the exception that the clamping surfaces are planar and the projection of each clamping surface, A1 for example, in a pair now forms with the other clamping surface, A2 for example, an angle NP of greater than 180 degrees.

Figure 9:
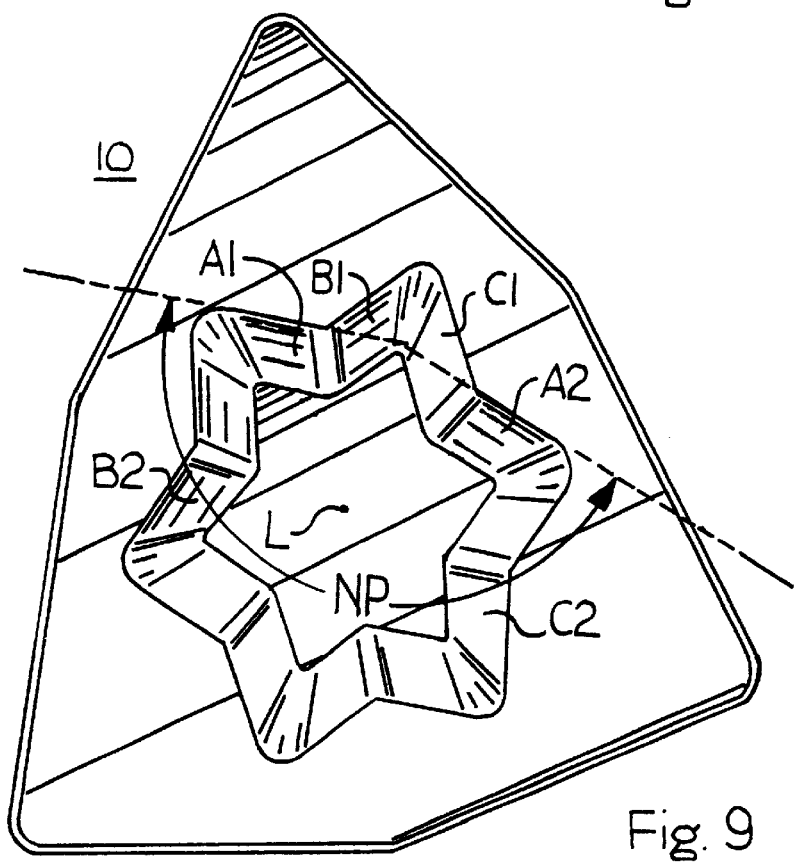
FIG. 9 is a variation of the top view illustrated in FIG. 5 whereby each pair of clamping surfaces is angled.

FIG. 9 illustrates another arrangement in which the pairs of clamping surfaces are planar but not coplanar within each pair. This arrangement is identical to the cavity 20 previously discussed with the exception that the clamping surfaces are planar and the projection of each clamping surface, A1 for example, in a pair now forms with the other clamping surface, A2 for example, an angle NP of less than 180 degrees.

Briefly returning to FIGS. 3 and 3A, the protruding nose 540 that could be used to retain the insert 10 illustrated in FIG. 8 would be that shown with sections 543A and 543B in FIG. 3. Furthermore, the protruding nose 540 that could be used to retain the insert 10 illustrated in FIG. 9 would be that shown with sections 544A and 544B in FIG. 3A.

Figure 10:
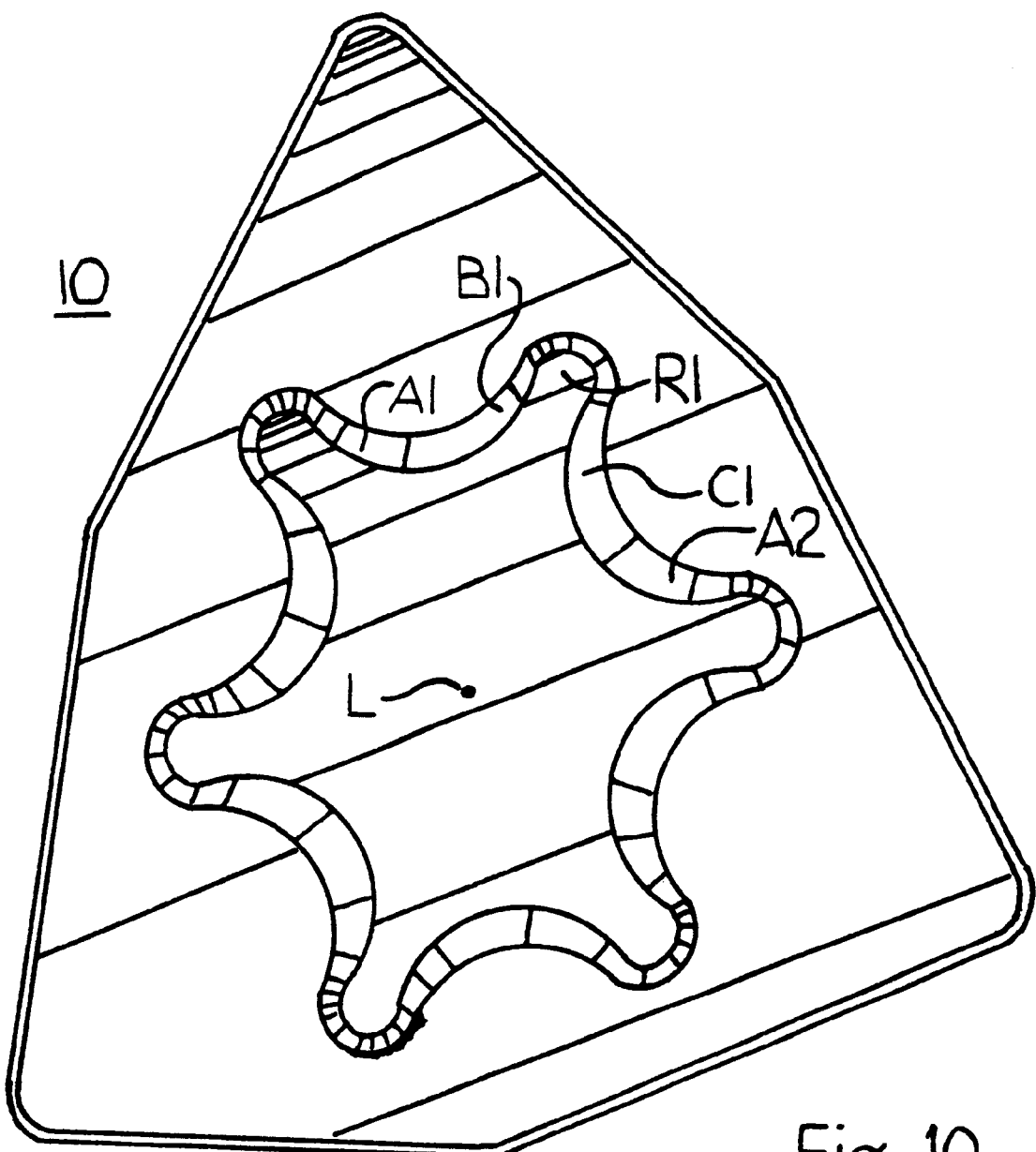
FIG. 10 is a variation of the top view illustrated in FIG. 5 whereby the clamping surfaces are convexly curved.

The clamping surfaces so far discussed have been planar. With reference to FIG. 10, the clamping surfaces A1–A2 and the clamping surfaces associated with each other pair may be curved when viewed from the top of the insert 10. Referring to FIG. 10, clamping surfaces A1–A2 are both curved in a convex fashion and recess R1 is defined by curved clamping surfaces B1 and C1. The curvature of each clamping surface may be approximately equal thereby permitting a continuous curve extending between, for example, the clamping surface A1 and the recess clamping surface B1 and between the clamping surface A2 and the recess clamping surface C1.

Figure 11:
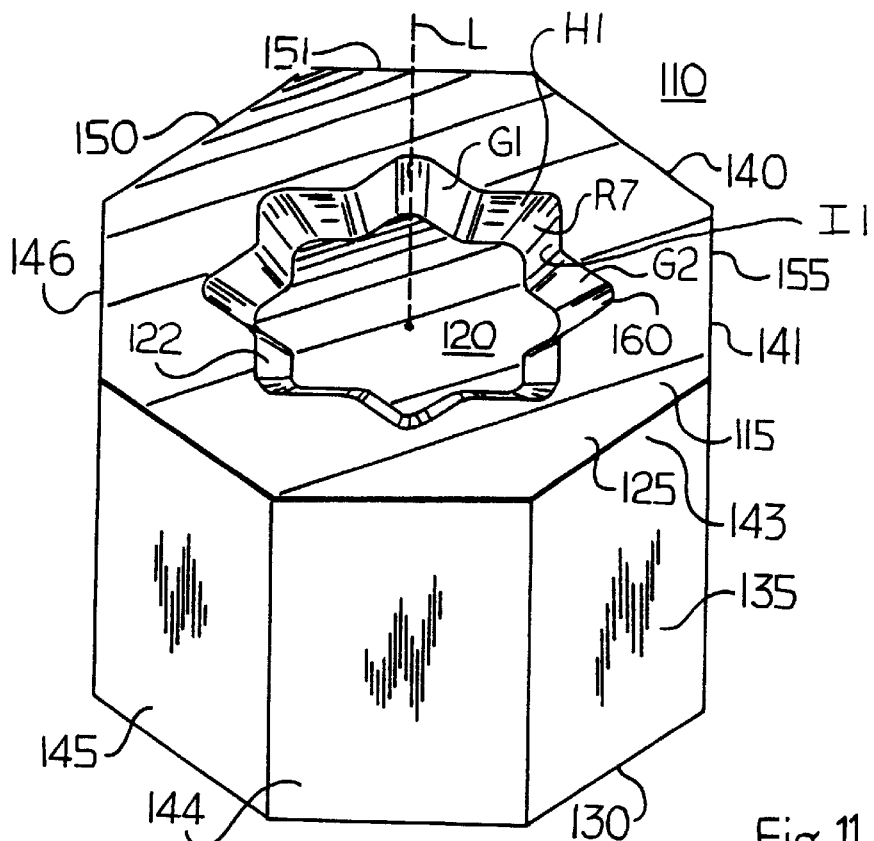
FIG. 11 is an isometric view of a cutting insert according to a second embodiment of the subject invention.
Figure 12:
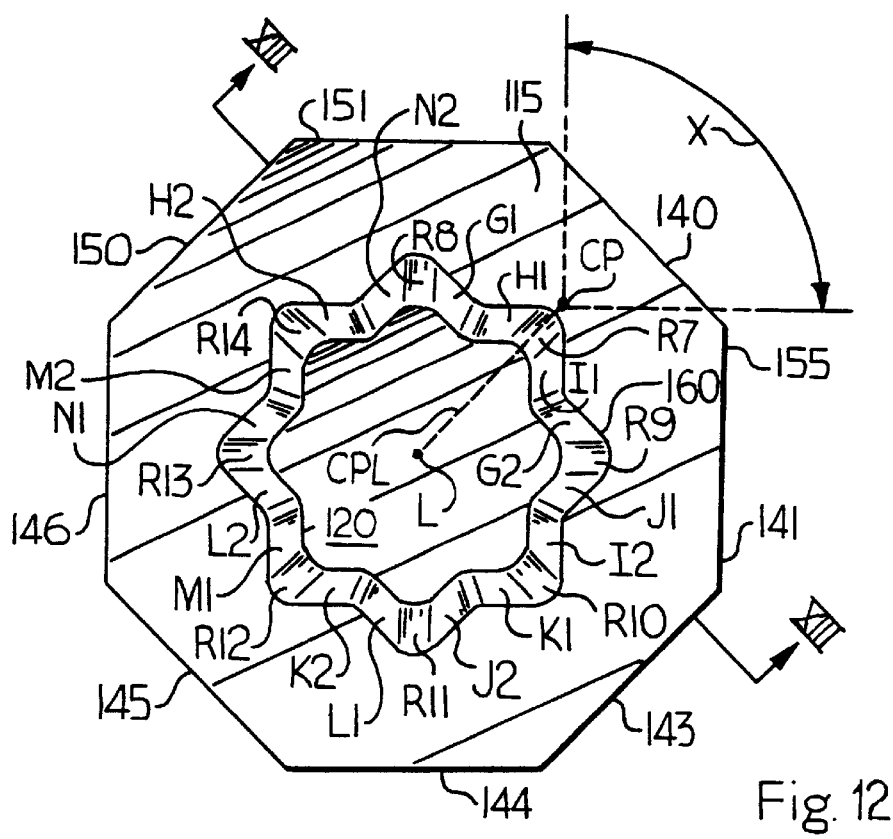
FIG. 12 is a top view of the cutting insert illustrated in FIG. 11.

FIGS. 1, 4 and 5 illustrate a polygon having six pairs of clamping surfaces A1–A2 through F1–F2 which form recess angles R1–R6 with one another of at least 60 degrees. FIGS. 11–12 illustrate another embodiment in which a cutting insert 110 has a body 115 with a cavity 120 having cavity walls 122. Unlike the cavity 20 described with respect to FIGS. 1, 4 and 5, the cavity 120 is comprised of eight pairs of clamping surfaces G1–G2 through N1–N2 each having an associated recess R7–R14 wherein the recess angle X is about 90 degrees. As illustrated in FIG. 11 and FIG. 12, the insert body 115 has a shape of an octagon having a top surface 125, a bottom surface 130 and a peripheral wall 135 comprised of sides 140, 141, 143, 144, 145, 146, 150 and 151. A cutting edge 155 is formed by the intersection of the peripheral wall 135 and the top surface 125. Additionally, a perimeter 160 of the cavity 120 has a shape of an equilateral polygon and the recesses R7–R14 are symmetrically positioned about the central longitudinal axis L.

Figure 13:
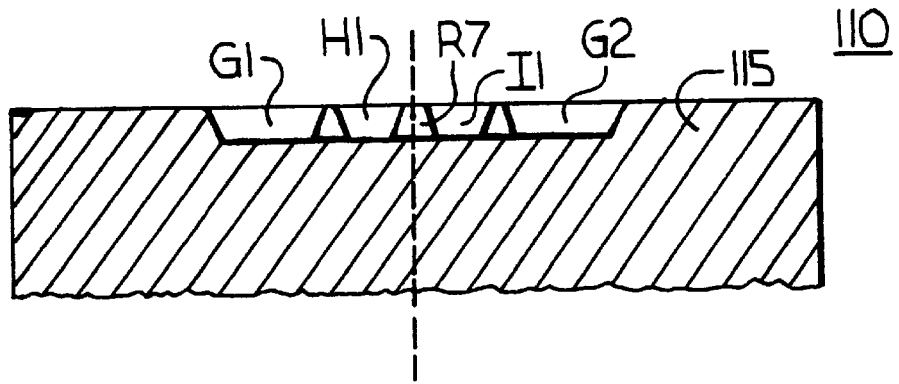
FIG. 13 is a sectional view along arrows XIII—XIII in FIG. 12.

A cross-sectional view directly facing a pair of clamping surfaces, for example, G1–G2 would have an appearance similar to those clamping surfaces A1–A2 illustrated in FIG. 6. Specifically, a sectional view XIII—XIII from FIG. 12 is illustrated in FIG. 13 directly facing the pair of clamping surfaces G1–G2. Within the recess R7 formed therebetween, clamping surface H1 forms one wall of the recess R7 and a clamping surface I1 forms another wall of the recess R7. A section view of any of the clamping surfaces G1–G2 through N1–N2 would reveal a clamping angle Y similar to that illustrated in FIG. 5 and the clamping angle Y may have a value between about 30 and about 70 degrees and preferably about 46 degrees.

Figure 14:
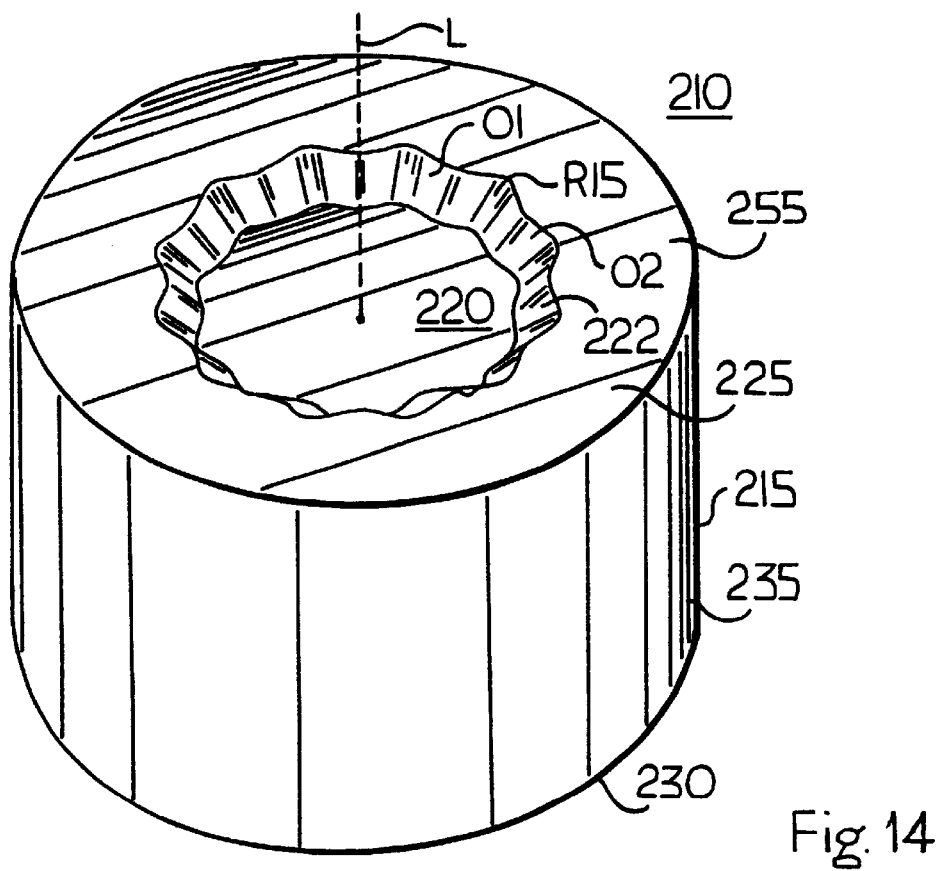
FIG. 14 is an isometric view of a cutting insert in accordance with a third embodiment of the subject invention.
Figure 15:
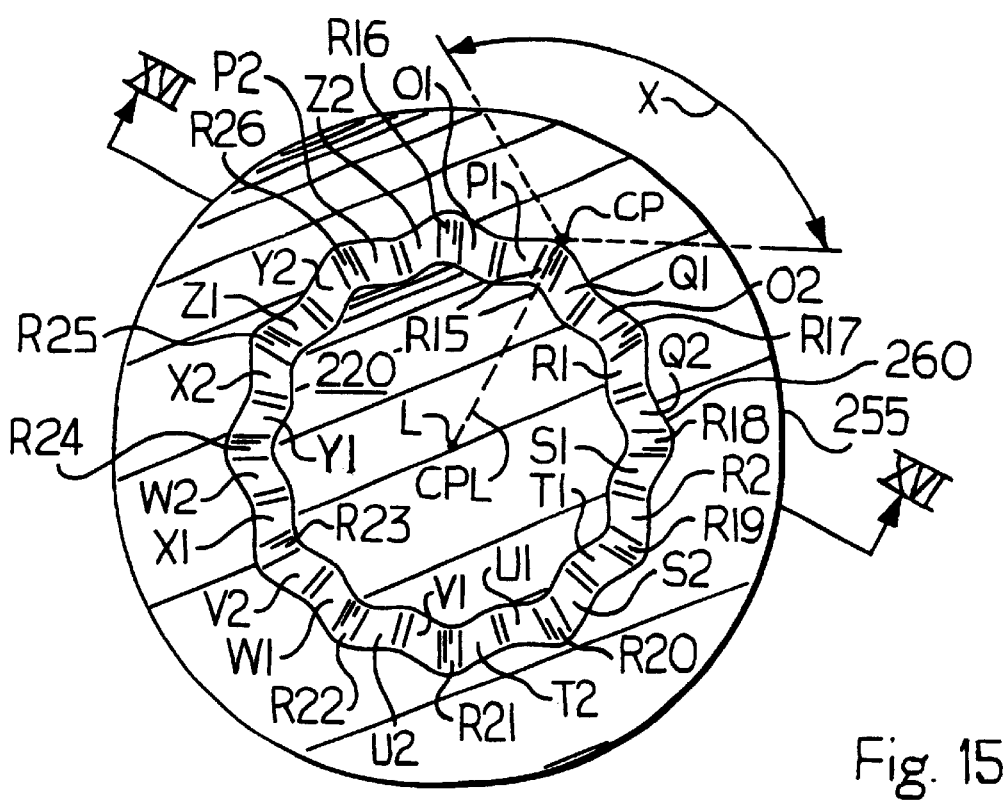
FIG. 15 is a top view of the cutting insert illustrated in FIG. 14.

FIGS. 14 and 15 illustrate yet another embodiment in which a cutting insert 210 has a body 215 with a cavity 220 having cavity walls 222. The cavity 220 is comprised of twelve pairs of clamping surfaces O1–O2 through Z1–Z2 each having an associated recess R15–R26 wherein the recess angle X is about 45 degrees. As illustrated in FIGS. 14 and 15, the insert body 215 has a circular shape with a top surface 225, a bottom surface 230 and a peripheral wall 235. A cutting edge 255 is formed by the intersection of the peripheral wall 235 and the top surface 225. Additionally, a perimeter 260 of the cavity 220 has the shape of an equilateral polygon and the recesses R15 through R26 may be symmetrically positioned about the central longitudinal axis L.

A cross-sectional view directly facing a pair of clamping surfaces, for example, O1–O2, would have an appearance similar to those clamping surfaces A1–A2 illustrated in FIG.

Figure 16:
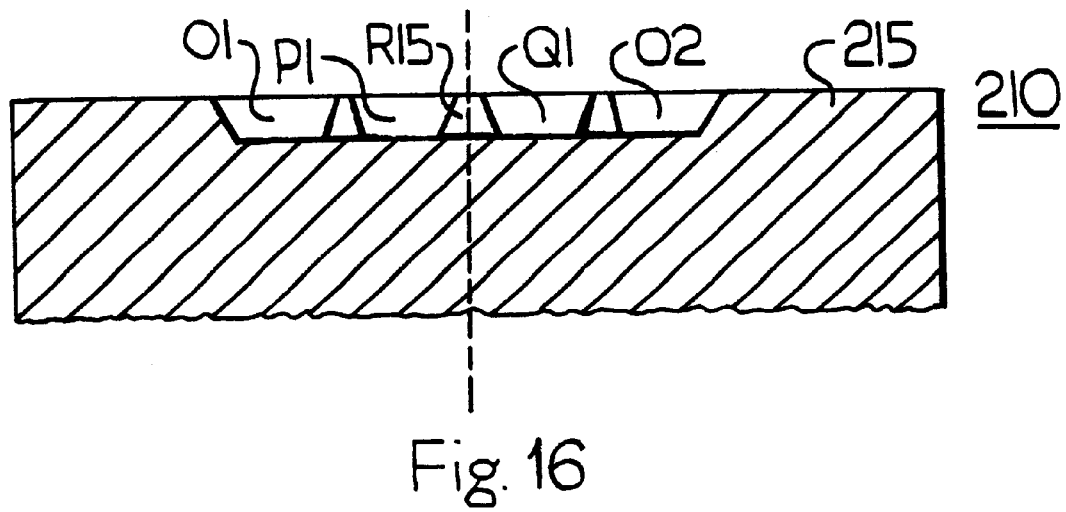
FIG. 16 is a cross-sectional view along arrows XVI—XVI in FIG. 15.

6. Specifically, a sectional view XVI—XVI of FIG. 15 is illustrated in FIG. 16 directly facing the pair of clamping surfaces O1–O2. Within the recess R15 formed therebetween, clamping surface P1 forms one wall of the recess and clamping surface Q1 forms another wall of the recess R15. A section view of any of the clamping surfaces O1–O2 through Z1–Z2 would reveal a clamping angle Y similar to that illustrated in FIG. 5 and the clamping angle Y would have a value of between about 30 to about 70 degrees.

The subject invention may be described in another way. Specifically, directing attention to FIG. 5, the perimeter 60 of the cavity 20 is made up of two identical polygonal shapes superimposed upon one another and having as a common center point the longitudinal central axis L. More specifically, with attention to FIG. 5, a line connecting clamping surfaces A1–A2, D1–D2 and F1–F2 forms a triangle having, as corners, recesses R1, R4 and R6. Similarly, a line connecting clamping surfaces B1–B2, E2–E1, C2–C1 would also define a triangle, having, as corners, recesses R3, R5 and R2, which has been superimposed upon the first triangle but rotated 180 degrees from the position of the original triangle. According to such a configuration, the recesses R1 through R6 have walls which may be projected to intersect at an outer corner point, for example, CP in FIG. 5. Each triangle is shifted relative to the other such that a line CPL extending from the central longitudinal axis L to the outer corner point CP lies midway between the clamping surfaces A1–A2 of the pair of clamping surfaces adjacent to that recess R1.

Directing attention to FIG. 12, the perimeter 160 of the cavity 120 is made up of two identical polygonal shapes superimposed upon one another and having as a common center point a central longitudinal axis L. Specifically, a line connecting clamping surfaces G1–G2, J1–J2, L1–L2, and N1–N2 forms a square having, as corners, recesses R9, R11, R13 and R8. Similarly, a line connecting clamping surfaces H1–H2, I1–I2, K1–K2 and M1–M2 likewise forms a square having, as corners, recesses R7, R10, R12 and R14. Each of these squares is shifted relative to one another such that a line from the central longitudinal axis L to one recess outer corner point, for example CP, associated with recess R7 lies midway between the clamping surfaces G1–G2 of the pair of clamping surfaces adjacent to that recess R7.

Directing attention to FIG. 15, once again, the perimeter 260 of the cavity 220 may be made up of two identical polygonal shapes superimposed upon one another and having, as a common center point, the longitudinal central axis L. Specifically, FIG. 15 illustrates a first hexagon defined by lines connecting clamping surfaces O1–O2, R1–R2, T1–T2, V1–V2, X1–X2 and Z1–Z2. A second hexagon is defined by a line connecting clamping surfaces P1–P2, Q1–Q2, S1–S2, U1–U2, W1–W2, and Y1–Y2. Each of the polygonal shapes is rotated relative to one another such that the line CPL from the central longitudinal axis L to one recess outer corner point CP lies midway between the clamping surfaces O1–O2 of the pair of clamping surfaces adjacent to the recess R15. It should be appreciated that cavities may be formed by overlaying other equilateral polygons such as heptagons and octagons. This may be of particular interest for cavities in inserts of larger sizes.

Certain cavity shapes have so far been associated with certain insert shapes. The application of these cavities for a variety of inserts is clearly 35 possible and such usage should not be limited to the insert shapes illustrated in FIGS. 1 and 4–16. Furthermore, each of the cavities so far discussed has had a recess with walls that converge to form recesses.

Figure 17:
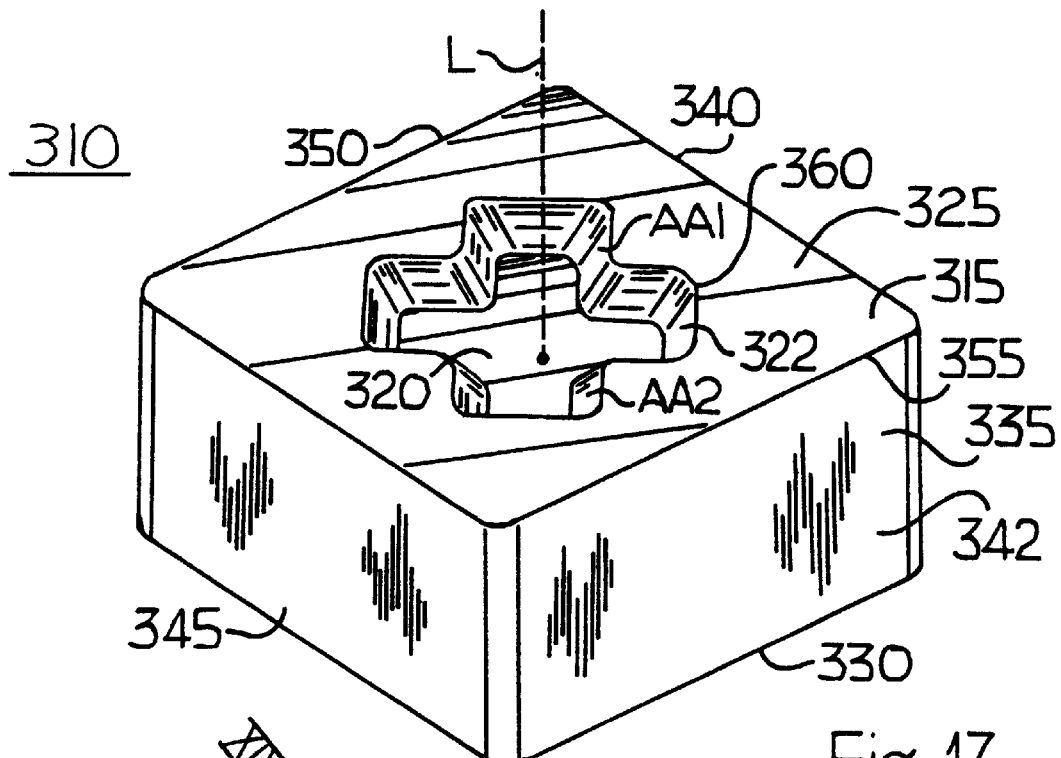
FIG. 17 is an isometric view of a cutting insert in accordance with a fourth embodiment of the subject invention.
Figure 18:
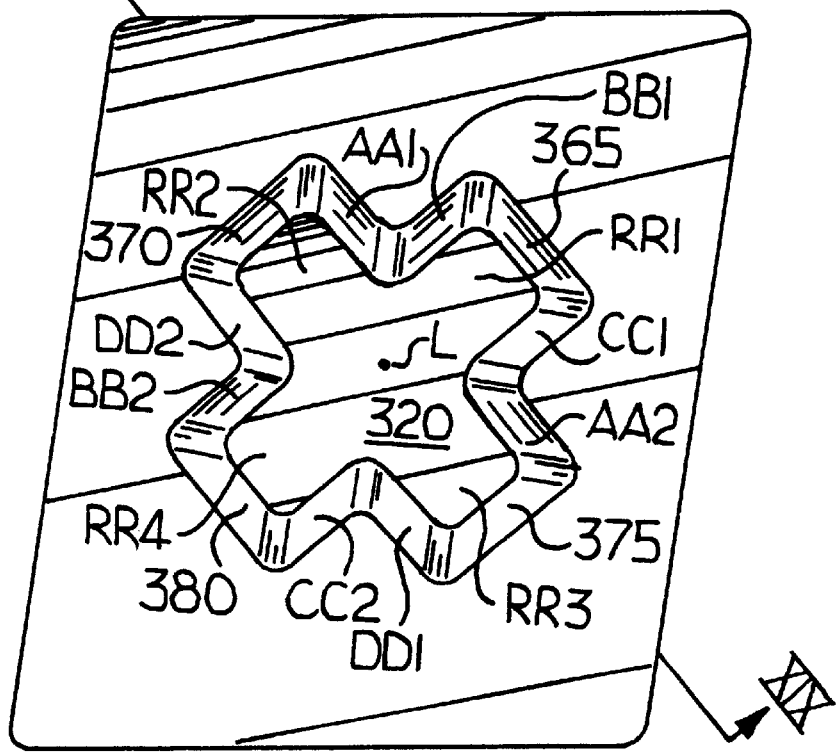
FIG. 18 is a top view of the cutting insert illustrated in FIG. 17.

FIGS. 17 and 18 illustrate a cutting insert 310 having a body 315 and a cavity 320 therein having cavity walls 322. The insert has a top surface 325 and a bottom surface 330 with a peripheral wall 335 therebetween. The peripheral wall has sides 340, 342, 345 and 350. A cutting edge 355 is formed by the intersection of the peripheral wall 335 and the top surface 325. Just as in the embodiments previously described, cavity 320 extends within the top surface 325 and cavity walls 322 define a plurality of pairs of clamping surfaces AA1–AA2 through DD1–DD2 wherein the clamping surfaces of each pair are coplanar and are separated from one another by a recess RR1–RR4. However, unlike the previously described recesses, the walls of these recesses are not converging but are parallel to one another to form not a V-shaped recess but a U-shaped recess. Just as before, however, the perimeter 360 of the cavity 310 is made up of a plurality of recesses RR1–RR4 that are symmetrical about the central longitudinal axis L and are equally spaced about the perimeter 360 of the recess 320.

The arrangement in FIGS. 17 and 18 may also be viewed as a cavity 320 made up of two identical polygonal shapes superimposed upon one another and having as a common center point the central longitudinal axis L. For example, recess RR1 has two parallel wall clamping surfaces BB1 and CC1. Between these clamping surfaces is a base 365. Bases 370, 375 and 380 are associated with recesses RR2, RR3 and RR4, respectively. These recesses also have parallel walls.

In FIGS. 17 and 18, the identical polygonal shapes are rectangles. A first rectangle is formed by lines extending from clamping surfaces AA1–AA2, base 375, clamping surfaces DD1–DD2, and base 370. A second rectangle is formed by lines extending between clamping surfaces BB1–BB2, base 365, clamping surfaces CC1–CC2 and base 380. Therefore, each polygonal shape is an identical rectangle and each rectangle is rotated 90 degrees relative to the other rectangle. With this arrangement, the split face of the pair of each clamping surface caused by the recess associated with that pair provides a smaller cavity than would be required if each pair of clamping surfaces were acquired to be a single continuous clamping surface.

While the shape of a rectangle has been discussed, the polygon shape illustrated in FIGS. 17–18 may be a parallelogram whereby the sides do not intersect at right angles to form rectangles.

Figure 19:
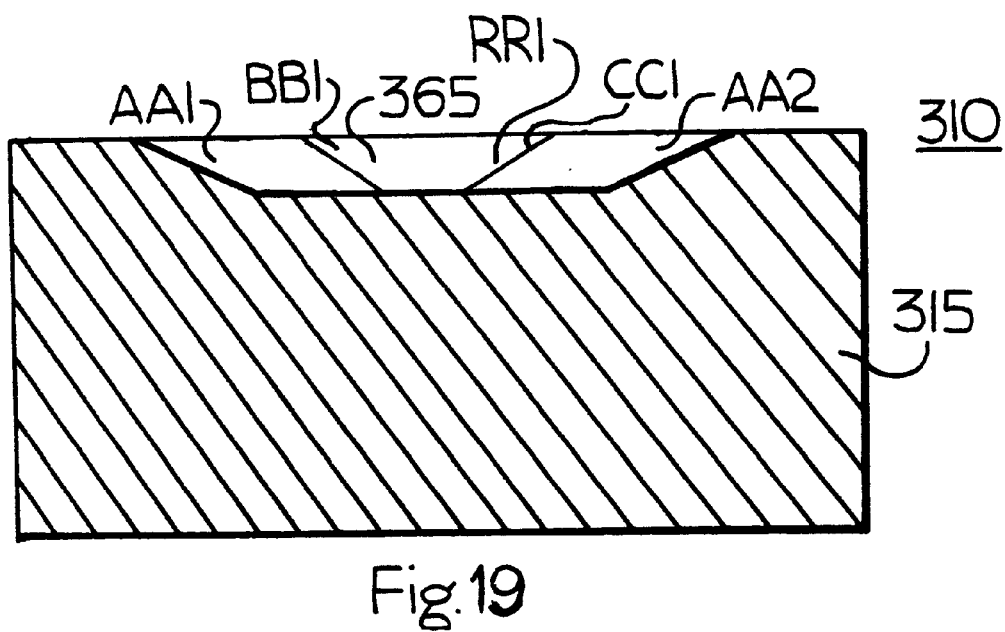
FIG. 19 is a sectional view along arrows XIX—XIX in FIG. 18.

A cross-sectional view directly facing a pair of clamping surfaces, for example AA1–AA2, would have an appearance similar to those clamping surfaces A1–A2 illustrated in FIG. 6. Specifically, FIG. 19 shows such a sectional view along arrows XIX—XIX in FIG. 18. Clamping surface BB1 forms one wall of the recess RR1 and clamping surface CC1 forms another wall of the recess RR1. Both of these clamping surfaces BB1 and CC1 are parallel to one another when viewed from the top of the insert 310 as illustrated in FIG. 18. A section view of any of the clamping surfaces AA1–AA2 through DD1–DD2 would reveal a clamping angle Y similar to that illustrated in FIG. 5 and the clamping angle Y may have a value between about 30 to about 70 degrees.

The inserts have been discussed as having a top surface with a cavity therein and the cavity has pairs of clamping surfaces. The inserts may also have cavities within their bottom surfaces and these cavities may also have pairs of clamping surfaces thereby making the inserts invertible. As an example, the cavity 20 in FIG. 6 appears on the top surface and the bottom surface of the insert 10. Furthermore, different cavity shapes than those illustrated in these embodiments may be used to provide different clamping surfaces.

While the arrangement in FIGS. 14 and 15 illustrates a polygon providing twelve pairs of clamping surfaces, additional pairs of clamping surfaces could be provided with a design in which the recess angle X is even greater. Such an arrangement may be desirable for larger inserts.

Finally, it should be appreciated that the cavity shapes associated with different insert shapes should not be a limitation to the subject invention because a number of different polygonal shapes may be used in different insert shapes as the application requires.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

What is claimed is:

1. A toolholder assembly comprised of:
   a) a toolholder with a body having a pocket formed therein which has at least one side wall and a bottom wall;
   b) a cutting insert with an insert body having:
      i) a top and a bottom surface;
      ii) a peripheral wall therebetween;
      iii) a cutting edge formed by the intersection of the peripheral wall and the top surface;
      iv) wherein a central cavity extends within the top surface and has cavity walls defining a plurality of pairs of clamping surfaces;
      v) wherein the clamping surfaces of a pair are separated from one another by a recess;
      vi) wherein for each pair of clamping surfaces, the associated recess is comprised of two other clamping surfaces associated with different pairs of clamping surfaces and the two other clamping surfaces within the recess converge as they extend away from the central longitudinal axis;
      vii) wherein the insert mounts within the toolholder pocket; and
   c) a clamp mounted upon the toolholder with a protruding nose which jointly engages one pair of the insert clamping surfaces and urges the insert into the pocket.

2. The assembly according to claim 1 wherein the protruding nose of the clamp has a cylindrical surface to contact a pair of clamping surfaces in the insert cavity.

3. The assembly according to claim 1 wherein the protruding nose is made up of two cylindrical surfaces oriented at an angle relative to one another to contact a pair of clamping surfaces in the insert cavity oriented at a similar angle.

4. The assembly according to claim 1 wherein the protruding nose of the clamp has a planar surface to contact a pair of clamping surfaces in the insert cavity.

5. The assembly according to claim 1 wherein the protruding nose of the clamp is made up of two planar surfaces oriented at an angle relative to one another to contact a pair of clamping surfaces in the insert cavity oriented at a similar angle.

6. The assembly according to claim 1 wherein the protruding nose of the clamp has a barrel-shaped surface to contact a pair of clamping surfaces in the insert cavity.

7. The assembly according to claim 1 wherein each pair of clamping surfaces on the insert is coplanar.

8. The assembly according to claim 1 wherein lines extending inwardly from each planar clamping surface of a pair intersect with one another along a line bisecting the angle of the recess between the pair of clamping surfaces.

9. The assembly according to claim 1 herein each clamping surface is concave.

10. The assembly according to claim 1 wherein only a single recess exists between each pair of clamping surfaces.

11. A cutting insert intended to be held within a toolholder by a clamp comprised of a body of wear-resistant material, said body having a central longitudinal axis extending therethrough and having:
    a) a top surface and a bottom surface;
    b) a peripheral wall therebetween;
    c) a cutting edge formed by the intersection of the peripheral wall and the top surface;
    d) wherein a central cavity extends within the top surface and has cavity walls defining a plurality of pairs of clamping surfaces;
    e) wherein the clamping surfaces of a pair are separated from one another by a recess;
    f) wherein both clamping surfaces of a pair are coplanar with one another; and
    g) wherein for each pair of clamping surfaces, the associated recess is comprised of two other clamping surfaces associated with different pairs of clamping surfaces and the two other clamping surfaces within the recess converge as they extend away from the central longitudinal axis.

12. The insert according to claim 11 wherein the recesses are symmetrically positioned about the central longitudinal axis.

13. The insert according to claim 11 wherein there are at least four recesses.

14. The insert according to claim 11 herein the converging walls of each recess form a recess angle of at least 60 degrees.

15. The insert according to claim 11 wherein each clamping surface is inclined with respect to the central longitudinal axis.

16. The insert according to claim 15 wherein each clamping surface forms a clamping angle with a plane perpendicular to the central axis of about between 30 to about 70 degrees.

17. The insert according to claim 11 further including a cavity in the bottom surface, wherein the cavity is identical to the cavity in the top surface, such that the insert is invertible.

18. The insert according to claim 11 wherein each cavity recess, has clamping surfaces which project to intersect at an outer corner point.

19. The assembly according to claim 11 wherein only a single recess exists between each pair of clamping surfaces.

20. A cutting insert intended to be held within a toolholder by a clamp comprised of a body of wear-resistant material, said body having a central longitudinal axis extending therethrough and having:
    a) a top surface and a bottom surface;
    b) a peripheral wall therebetween;
    c) a cutting edge formed by the intersection of the peripheral wall and the top surface;
    d) wherein a central cavity extends within the top surface and has cavity walls defining a plurality of pairs of clamping surfaces;
    e) wherein the clamping surfaces of a pair are separated from one another by a recess;
    f) wherein both clamping surfaces of a pair are planar; and g) wherein for each pair of clamping surfaces, the associated recess is comprised of two other clamping surfaces associated with different pairs of clamping surfaces and the two other clamping surfaces within the recess converge at an angle as they extend away from the central longitudinal axis;

h) wherein lines extending inwardly from each planar clamping surface of a pair intersect with one another along a line bisecting the angle of the recess between the pair of clamping surfaces.

21. The insert according to claim 20 wherein the clamping surfaces of each pair are planar and the projection of each clamping surface of a pair forms an angle with the other clamping surface in the pair of greater than 180 degrees.

22. The insert according to claim 20 wherein the clamping surfaces of each pair are planar and the projection of each clamping surface of a pair forms an angle with the other clamping surface in the pair of less than 180 degrees.

23. The insert according to claim 20 wherein the recesses are symmetrically positioned about the central longitudinal axis.

24. The insert according to claim 20 wherein there are at least four recesses.

25. The insert according to claim 20 wherein the converging walls of each recess form a recess angle of at least 60 degrees.

26. The insert according to claim 20 wherein each clamping surface is inclined with respect to the central longitudinal axis.

27. The insert according to claim 26 wherein each clamping surface forms a clamping angle with a plane perpendicular to the central axis of about between 30 to about 70 degrees.

28. The insert according to claim 20 further including a cavity in the bottom surface, wherein the cavity is identical to the cavity in the top surface, such that the insert is invertible.

29. The insert according to claim 20 herein each cavity recess has clamping surfaces which project to intersect at an outer corner point.

30. The assembly according to claim 20 wherein only a single recess exists between each pair of clamping surfaces.

31. A cutting insert intended to be held within a toolholder by a clamp comprised of a body of wear-resistant material, said body having a central longitudinal axis extending therethrough and having:

a) a top surface and a bottom surface;

b) a peripheral wall therebetween;

c) a cutting edge formed by the intersection of the peripheral wall and the top surface;

d) wherein a central cavity extends within the top surface and has cavity walls defining a plurality of pairs of clamping surfaces;

e) wherein the clamping surfaces of a pair are separated from one another by a recess;

f) wherein both clamping surfaces of a pair are convexly curved;

g) wherein for said pair of clamping surfaces, the associated recess is comprised of two other clamping surfaces associated with different pairs of clamping surfaces and the two other clamping surfaces within the recess converge as they extend away from the central longitudinal axis; and h) wherein a common line intersects one tangential point along each clamping surface of a pair.

32. The insert according to claim 31 wherein the recesses are symmetrically positioned about the central longitudinal axis.

33. The insert according to claim 31 wherein there are at least four recesses.

34. The insert according to claim 31 wherein each clamping surface is inclined with respect to the central longitudinal axis.

35. The insert according to claim 34 wherein each clamping surface forms a clamping angle with a plane perpendicular to the central axis of about between 30 to about 70 degrees.

36. The insert according to claim 31 further including a cavity in the bottom surface, wherein the cavity is identical to the cavity in the top surface, such that the insert is invertible.

37. The insert according to claim 31 wherein only a single recess exists between each pair of clamping surfaces.

* * * * *